United States Patent [19]

Freiherr von Arnim et al.

[11] 4,340,089
[45] Jul. 20, 1982

[54] BELLOWS ELEMENT

[75] Inventors: Dietlof Freiherr von Arnim, Karlsruhe; Rolf Dahn, Bretten-Dürenbüchig, both of Fed. Rep. of Germany

[73] Assignee: IWK Regler und Kompensatoren GmbH, Stutensee, Fed. Rep. of Germany

[21] Appl. No.: 190,262

[22] Filed: Sep. 24, 1980

[30] Foreign Application Priority Data

Nov. 29, 1979 [DE] Fed. Rep. of Germany ....... 2948065

[51] Int. Cl.³ ............................................. F16L 11/11
[52] U.S. Cl. .................................................. 138/121
[58] Field of Search ................... 138/121, 173; 239/33

[56] References Cited

U.S. PATENT DOCUMENTS 2,876,801  3/1959  November .
3,427,035  2/1969  Heldt .
3,908,704  9/1975  Clement et al. ..................... 138/121

FOREIGN PATENT DOCUMENTS 816465  10/1951  Fed. Rep. of Germany .
2651661  9/1978  Fed. Rep. of Germany .

Primary Examiner—Robert I. Smith
Attorney, Agent, or Firm—Sandler & Greenblum

[57] ABSTRACT

A tubular bellows element for fluids is provided which has concentric corrugations. The corrugations include flanks separated by spaces which narrow towards inner ends of the corrugations. The inner corrugation ends have a conical shape, and act as scales to increase the degree to which the ends of the bellows element can be moved with respect to each other. The inner ends also serve to provide an essentially smooth inner surface for the bellows element, minimizing both flow disturbance and the creation of turbulence.

6 Claims, 1 Drawing Figure

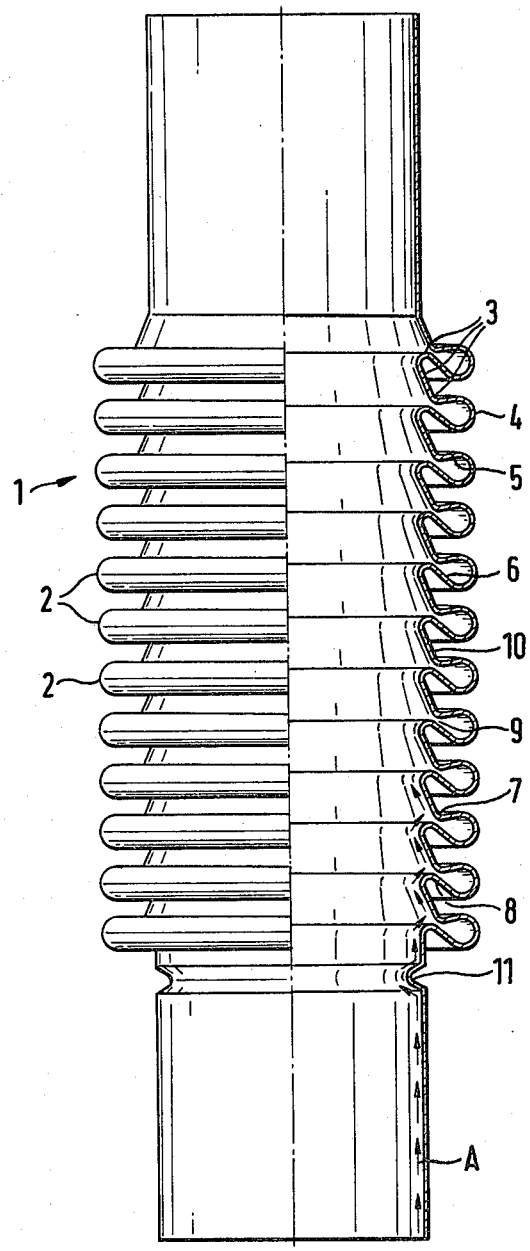

BELLOWS ELEMENT

BACKGROUND OF THE INVENTION

The present invention relates to a tubular corrugated bellows element for fluids, that is to say liquids or gases, with a plurality of corrugations running concentrically round the bellows axis in successive fashion. Annular spaces are provided between the flanks of adjacent bellows corrugations; these spaces become narrower at the inner ends of the corrugations, which are of flat form.

Corrugated bellows elements comprise an elastic structure in which generally undesired vibrations may readily be caused when liquid or gaseous material flows through the element. The cause of such vibration or oscillation is, generally speaking, the formation of eddies within the annular spaced between the corrugations. Such fluid-caused vibration may have mixed with, or been superimposed on, external mechanical vibrations acting on the bellows element by way of the structures joined therewith. This form of vibration is specially important when such bellows elements are used as compensators in exhaust systems, more specially in motor vehicles in fact, for such purposes, normal corrugated-pipe bellows element compensators may not be generally used.

When used in this fashion it is necessary, for this reason, to make use of a guide pipe within the bellows element, and to shut off the ring-spaces between the bellows corrugations from the inside of the bellows so that the forming of eddies or vortices is completely out of the question. In addition to the increased price of producing and fixing such bellows elements when in position, such elements may be used when only acted upon only by axial forces, because changing their angles is not possible without damage, and because sideways motion is only possible within certain tight limits.

Although motion will be freer if a flexible pipe is used in place of the stiff guide pipe (see German Pat. No. 816,465), troublesome conditions are more likely, to arise, particularly when axial motion is desired, because the elasticity of the flexible pipe in the axial direction, particularly when under pressure, is very much less than the resilient capacity of the compensator. For this reason, if axial motion takes place past a certain limit, the flexible pipe will kink for this reason, dependent on the wall thickness, the compensator may also be kinked. Furthermore, such a flexible pipe may only be used with certain sorts of fluids.

To permit the last-named sort of motion occur, at least to a limited degree, a further suggestion has been made in the prior art (see German specification No. 2,651,661) for placing a wire fabric, made into the form of a pipe, within the bellows element. Such an element is, however, naturally high in price which respect to its production and placement.

In the case of a simpler design, of the sort noted earlier in this specification (see U.S. Pat. No. 2,876,801), a smooth inner wall within a corrugated pipe is to be produced, for getting better flow conditions for fluids, by so designing the flanks of the bellows corrugations, and by making the ring-space between them narrower while running inwardly in parallel fashion to the axis of the corrugated pipe. The bellows' inner corrugation ends are made flat so that in the direction of flow, a generally pipe-like wall structure is produced. With this known bellows structure, it may be that undesired flow conditions are eliminated; this occurs, however, only in the case of static conditions. For example, axial motion of the corrugated bellows element is very limited so that, if anything, only stretching forces, but not compression forces, may be taken up by the bellows element, because, in the case of compression forces, the inner corrugation ends of the bellows element are pushed together, even by a very small motion, and they will necessarily be bent. Furthermore, changes in angle (between the two ends of the bellows) are generally not possible, because, in this case, the inner corrugation ends of the bellows element on the envelope line up with the smaller radius of curvature, and they will necessarily be pushed up against each other. For correcting such undesired flow conditions, it is necessary, in the case of such a bellows element, to make a design such that there is no axial motion and change in angle or bending, such motion, however, being the main function of a corrugated bellows element.

SUMMARY OF THE INVENTION

Taking as a starting point a bellows element with the above-noted structure and flow properties, one purpose of the present invention is to increase the degree of possible axial motion and change in angle of the corrugated bellows element to such a degree as with, for example, widely used bellows elements, while nevertheless maintaining useful flow properties.

For effecting this and other purposes, in the invention, the inner ends of the corrugations of the bellows have a conical inward slope only in the direction of flow, towards the axis of the bellows element. The corrugations decrease in diameter when flow occurs in a given direction.

With the design of the present invention, the inner ends of the bellows corrugations take the form of a scale-like, ordered succession of guide faces for the flow so that—in comparison with old bellows elements—a smoothing effect is produced while, at the same time, the flow being directed into the ring-spaces between the corrugations of the bellows is stopped. However, in this respect there is no, or only a very small, increase in resistance to axial motion, because the inner corrugation ends may slide over each other like the scales of a snake. The same is true for changes in angle of the corrugated bellows element of the invention. While so far, in the corrugated bellows art, the separate corrugations have, in all cases, been completely symmetrical axially and radially, such a design is not used in the present invention, which suggests a structure which, in radial section, is not symmetrical.

Although in a different field that the present invention, shaft seals have been put forward (see U.S. Pat. No. 3,427,035) which are made in the form of a corrugated flexible pipe with the inner ends of the corrugations resting against the outer face of the shaft while the outer ends of the corrugations abut against the inner wall of a sealed space in the housing of the shaft, the corrugations are not symmetrical in radial section. It is, in the case of this earlier design, an elastomeric cuff designed on the lines of a labyrinth seal, in which questions arise which are connected with production engineering and engineering design in relation to a metallic bellows element; furthermore, questions in connection with flow and vibration arise in relation to a fluid flow guided by a corrugated bellows element these are in no way important.

In one working example of the invention, the limits between the two flanks of each corrugation and the inner corrugation ends are generally in the same radial plane of the bellows element, this having the effect of stopping the motion of fluid flowing into the bellows corrugations to an even greater degree, such motion in fact only generally being possible in the case of flow moving in a generally backward direction. With this design, furthermore, the bellows corrugations may be moved freely to the necessary degree, although the ring-space (or annular space) is very narrow.

In a further development of the invention, the flanks are made with different heights so that the corrugation form is made simpler the flanks are also radially arranged with respect to the axis of the tubular element.

In the case of corrugated bellows elements for use with a flow and without either of guide pipe or fabric inner part, certain conditions and events are produced: within the corrugated bellows element there are, because of the bellows corrugations, additional eddies in the flowing material, the position at which such eddies come from as their starting point moving along the long-axis of the bellows in a manner which is dependent upon the flow speed and flow pressure. For this reason, dependent on the conditions of use, different sorts of vibrations are produced, which, particularly if they come within the resonant range, are likely to cause destruction of the element.

For putting an end to such undesired effects, in the present invention, at some distance before the first bellows corrugation in the direction of flow, there is an inner collar which narrows the bore of the element. This inner collar takes the form of an artificial eddy producer, by which the condition of the boundary layer of the flowing material is so changed that the position at which eddies or turbulence are produced is, purposely, moved into a position before the start of the corrugations so that there is an even flow, which now has eddies or turbulence going towards the corrugated bellows element part. For this reason, the effect of different operation conditions on the production of vibrations is eliminated so that the useful hydro- or aerodynamic effects of prior art bellows elements are maintained, even in the case of use of bellows elements in which troublesome conditions are likely to occur.

The FIGURE illustrates the tubular bellows element of the invention.

BRIEF DESCRIPTION OF THE DRAWING

An account will now be given of one working example of the invention, of which a diagrammatic view is to be seen in the FIGURE.

The corrugated metal bellows element, generally numbered 1, has a number of like bellows corrugations 2 placed concentrically about the bellows axis in successive fashion. These corrugations are made up of inner corrugation ends 3 and outer corrugation ends 4, joined together by sides or flanks 5 and 6. Between the limits 7 and 8 located between the flanks 5 and 6 and the inner corrugation ends 3, ring-spaces or gaps 9 are formed. The bellows' inner corrugation ends 3 have, in each case, a conical flattened part 10 the parts are designed run in the same direction and to guide material flow clear of ring-spaces 9. For this reason, the flow of material generally goes through the bellows element without any turbulence. In the case of the working example shown, the flattened parts 10 are so placed that their conical faces undergo a decrease in diameter in the direction of flow.

In the example of the FIGURE, the first bellows corrugation in the direction of flow takes the form of an inwardly running collar 11, having an effect on the flow A of the material and taking the form, for example, of a bent-in groove.

The flanks 5, 6 of each bellows corrugation 2 are different in height so that the limits 7, 8 between the inner bellows corrugations 3 and the flattened parts 10 are out of line radially in relation to each other. For this reason, the ring-spaces (or annular spaces) 9 will be in the "wind shadow" of the flow, that is to say screened off. This effect is made even stronger because the limits 7, 8 on one corrugation are generally in the same radial plane so that the annular gaps 9 will be screened off from the flow by limits 8 of the corrugations, at which position the corrugations have the form of a lip or scale.

We claim:

1. A tubular bellows element having a plurality of corrugations successively arranged in concentric fashion about the axis of said tubular element, each corrugation having an outer end, an inner end, and flanks connecting said outer and inner ends, adjacent corrugations being separated by substantially annular spaces which narrow adjacent said inner corrugation ends, each inner corrugation end being substantially conical and including a substantially flat portion, said flat portions together forming a substantially smooth inner surface for guiding fluid flow in a predetermined direction.

2. A tubular element in accordance with claim 1 wherein each corrugation has two flanks, said flanks having limits which are positioned along the same substantially radial plane.

3. A tubular element in accordance with claim 2 wherein the two flanks of each corrugation have different heights.

4. A tubular element in accordance with claim 3 which has an inlet end, wherein one of said corrugations, adjacent to said inlet end, comprises a first corrugation, said first corrugation extending into, and thus decreasing the flow diameter of, said tubular element.

5. A tubular element in accordance with claim 1 wherein said element is metal.

6. A tubular bellows element formed of metal and comprising a wall having an axis, an inlet flow end, an outlet flow end, and a plurality of substantially similar corrugations comprising means for enhancing relative motion between said inlet and said outlet ends, each of said corrugations having two flanks which are positioned in substantially radial fashion with respect to said axis, each corrugation also including an inner corrugation end connecting said two flanks, each inner corrugation end being substantially conical and having a substantially conical and flat inner face, said substantially conical ends decreasing in diameter, as viewed in a predetermined direction along said axis, said flat faces comprising lining scales which are adapted to slidably move over each other during relative motion between said inlet and said outlet bellows ends.

* * * * *

UNITED STATES PATENT AND TRADEMARK OFFICE
CERTIFICATE OF CORRECTION

PATENT NO. : 4,340,089

DATED : July 20, 1982

INVENTOR(S) : Dietlof FREIHERR VON ARNIM et al.

It is certified that error appears in the above-identified patent and that said Letters Patent is hereby corrected as shown below:

Column 1, line 18, "spaced" should be --spaces--;

line 35, "only" should be deleted; and line 51, --to-- should be inserted after "motion".

Column 2, line 53, "that" should be --than--; and line 67, --;-- should be inserted after "element".

Column 3, line 14, --;-- should be inserted after "simpler";

line 17, "of" should be --a--;

line 36, "arc" should be --are--; and line 62, --to-- should be inserted after "designed".

Signed and Sealed this

Eighteenth Day of January 1983

[SEAL]

Attest:

Attesting Officer

GERALD J. MOSSINGHOFF

Commissioner of Patents and Trademarks